(12) United States Patent
Atherton

(10) Patent No.: US 8,789,548 B2
(45) Date of Patent: Jul. 29, 2014

(54) PORTABLE UNIVERSAL PICKUP BED HUNTING BLIND

(71) Applicant: Richard Andrew Atherton, Austin, TX (US)

(72) Inventor: Richard Andrew Atherton, Austin, TX (US)

(*) Notice: Subject to any disclaimer, the term of this patent is extended or adjusted under 35 U.S.C. 154(b) by 146 days.

(21) Appl. No.: 13/646,504

(22) Filed: Oct. 5, 2012

(65) Prior Publication Data
US 2013/0087178 A1  Apr. 11, 2013

Related U.S. Application Data

(60) Provisional application No. 61/545,133, filed on Oct. 8, 2011.

(51) Int. Cl.
B60P 3/34  (2006.01)

(52) U.S. Cl.
USPC .......... 135/88.13; 135/96; 135/121; 135/150; 135/901; 296/100.18; 296/163

(58) Field of Classification Search
USPC .......... 135/88.05, 88.07, 88.09, 88.13, 88.19, 135/121–122, 96, 115, 144, 148–150, 158, 135/901; 296/159, 160, 163, 100.11, 296/100.17, 100.18, 3
See application file for complete search history.

(56) References Cited

U.S. PATENT DOCUMENTS

| 1,247,282 A * | 11/1917 | Kline ........................... 296/172 |
| 1,584,518 A | 5/1926 | Drake |
| 2,151,908 A | 3/1939 | Gottlieb |
| 2,889,839 A | 6/1959 | Sheridan, Jr. |
| 2,936,204 A | 5/1960 | Sofi |
| 3,289,787 A | 12/1966 | McSwain |
| 3,367,347 A | 2/1968 | Smith |
| 3,690,334 A | 9/1972 | Miller |
| 4,332,265 A * | 6/1982 | Baker ........................... 296/159 |
| 4,398,763 A * | 8/1983 | Louw ............................ 296/3 |
| 4,788,997 A | 12/1988 | Clopton |
| 5,037,153 A * | 8/1991 | Stark ........................... 296/37.6 |
| 5,056,855 A | 10/1991 | Moravsky |
| 5,203,364 A * | 4/1993 | Koole .......................... 135/148 |
| 5,209,545 A * | 5/1993 | Slaugh ....................... 296/136.07 |
| 5,273,316 A | 12/1993 | Infante |
| 5,301,706 A | 4/1994 | Jones |
| 5,423,587 A * | 6/1995 | Ingram .......................... 296/3 |
| 5,458,079 A | 10/1995 | Matthews et al. |
| 5,549,938 A | 8/1996 | Nesbitt |
| 5,615,633 A | 4/1997 | Cripe |
| 5,752,736 A * | 5/1998 | Nodier ...................... 296/100.18 |
| 6,017,079 A | 1/2000 | Warner |
| 6,155,279 A | 12/2000 | Humphrey |
| 6,209,944 B1 * | 4/2001 | Billiu et al. .............. 296/100.02 |
| 6,394,118 B1 * | 5/2002 | Cikanowick et al. ...... 135/88.06 |
| 6,460,653 B1 | 10/2002 | Hardy et al. |
| 6,481,784 B2 | 11/2002 | Cargill |
| 6,539,966 B2 | 4/2003 | Raines, Jr. et al. |

(Continued)

Primary Examiner — Winnie Yip
(74) Attorney, Agent, or Firm — The Culbertson Group, PC

(57) ABSTRACT

A portable hunting or wildlife observation structure is designed to fit to the bed of most pickup trucks. All components of the structure may be stored inside a lockable storage case, which also acts as a bed width adjustable bench seat for the user when the structure is assembled. The structure's five-sided structure may incorporate height adjustable shooting bars and a roof structure. A weatherproof camouflage material provides a surround and roof cover for the structure. Separate weatherproof camouflage material may be magnetically attached to conceal the truck.

15 Claims, 11 Drawing Sheets

(56) References Cited

U.S. PATENT DOCUMENTS

| | | |
|---|---|---|
| 6,554,169 B1 * | 4/2003 | Furlong .................. 224/404 |
| 6,616,212 B1 | 9/2003 | Bishop |
| 6,802,327 B2 | 10/2004 | Koss |
| 7,021,694 B1 | 4/2006 | Roberts et al. |
| 7,766,022 B2 | 8/2010 | Livacich et al. |
| 2002/0078988 A1 | 6/2002 | Valpredo |
| 2002/0139408 A1 * | 10/2002 | Mitzner .................. 135/115 |
| 2006/0169309 A1 | 8/2006 | Brackins |
| 2009/0200820 A1 * | 8/2009 | Smith, Jr. ................. 296/3 |

\* cited by examiner

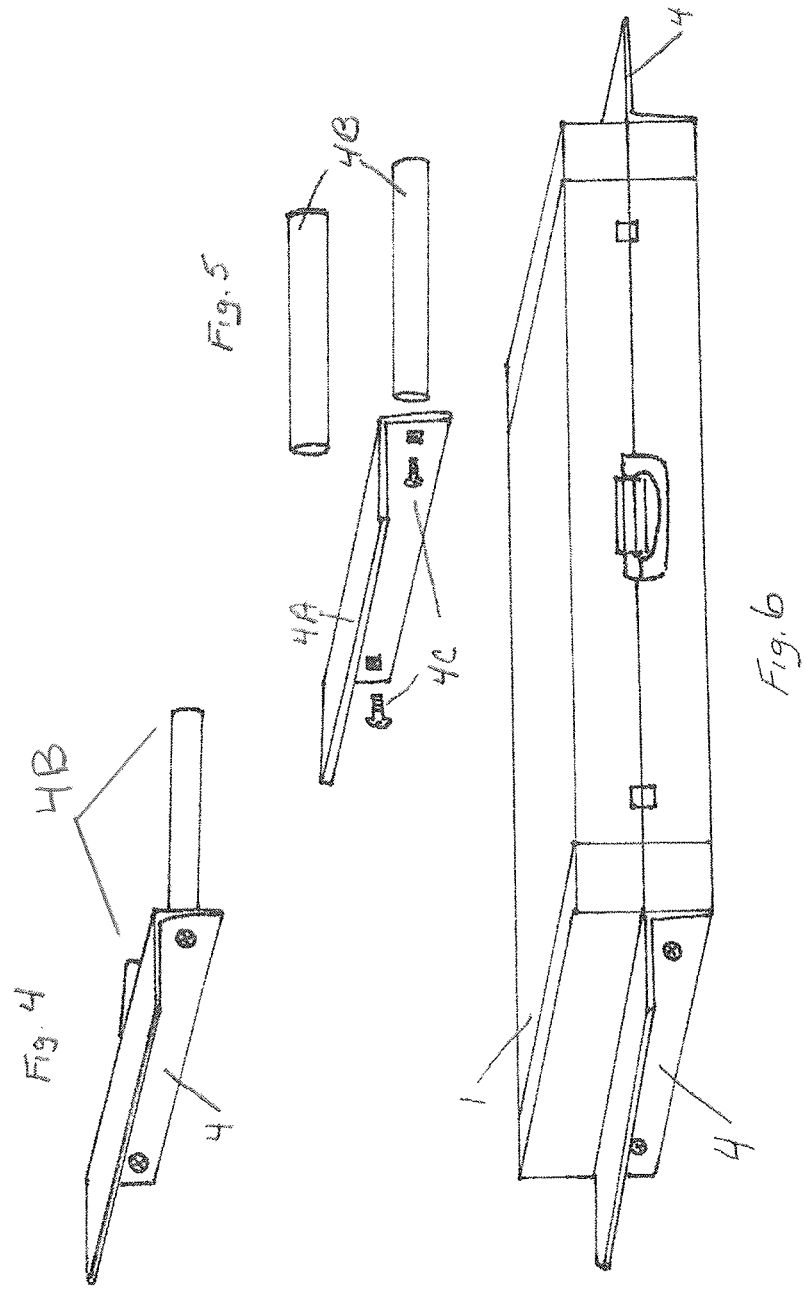

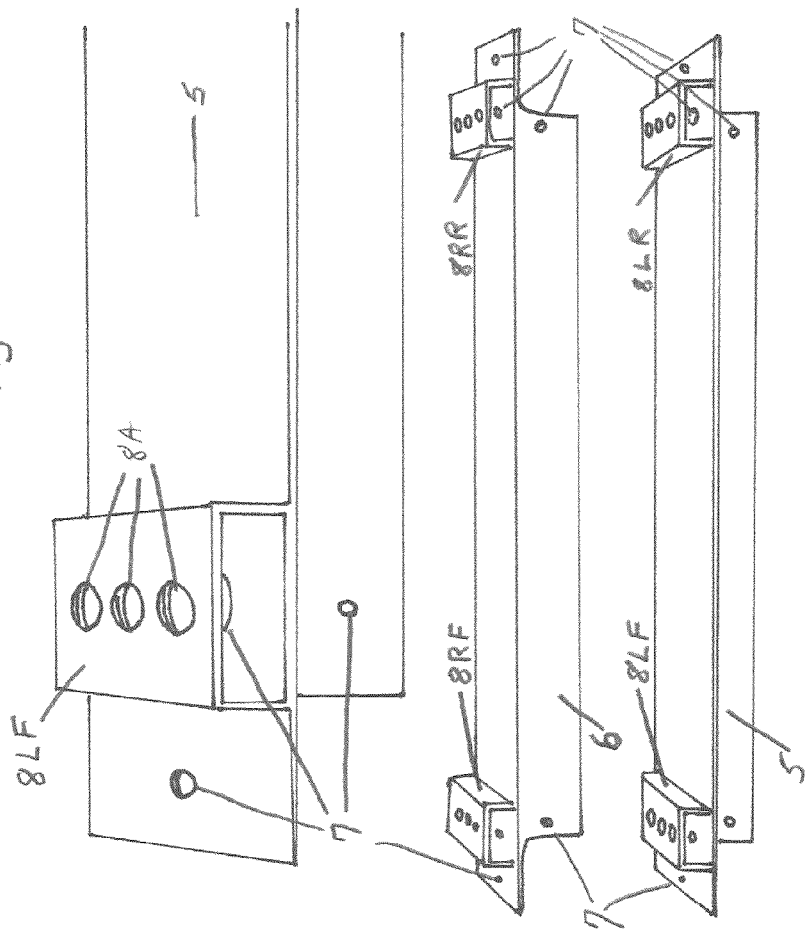

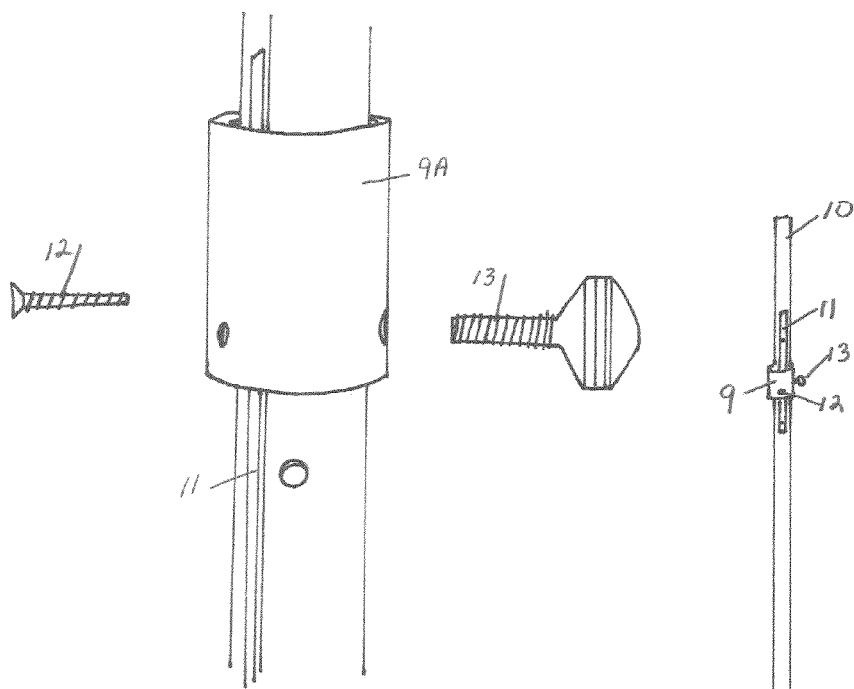
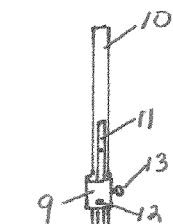
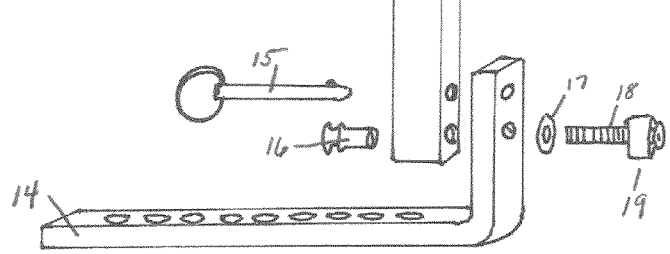

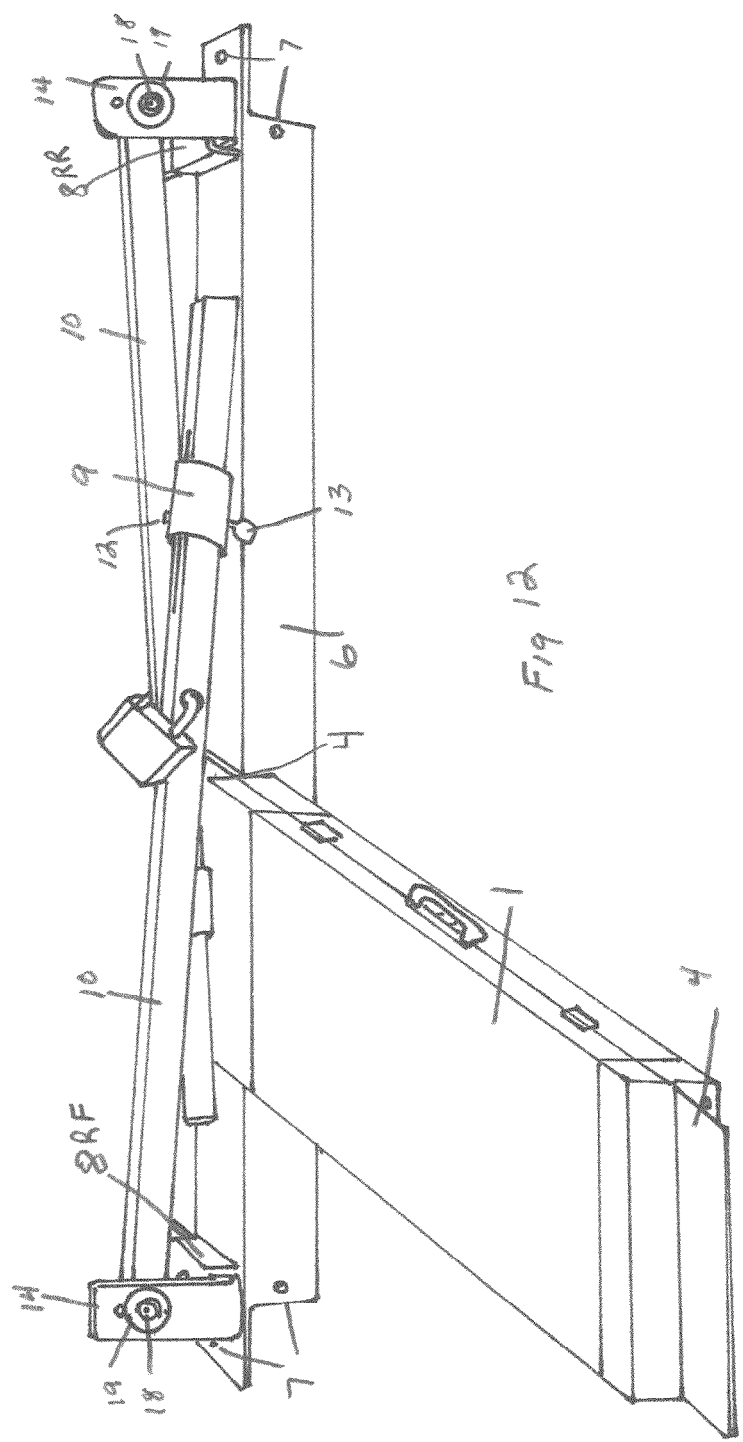

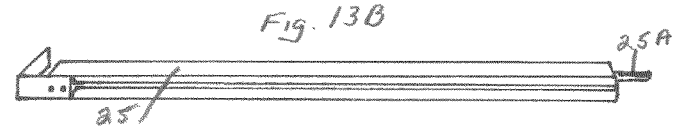
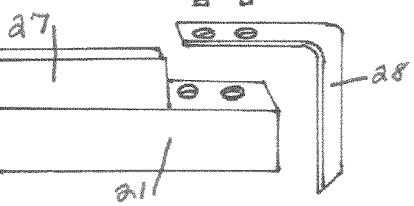
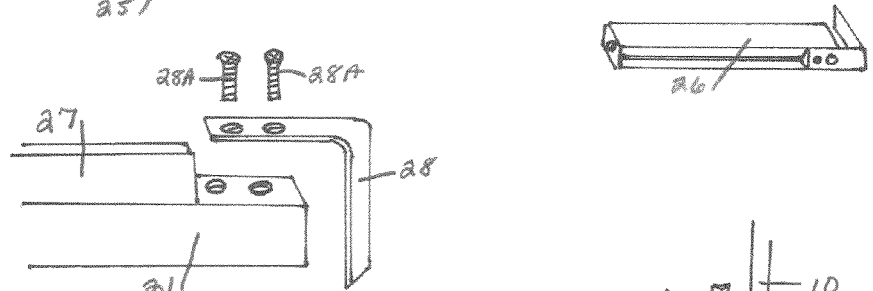
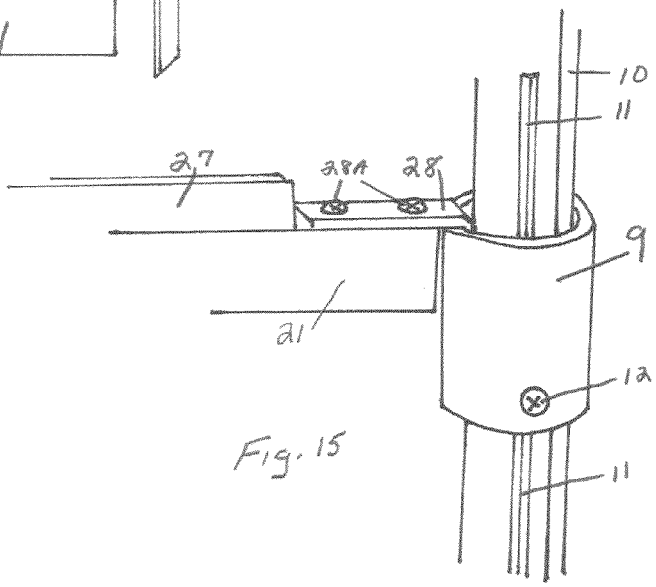

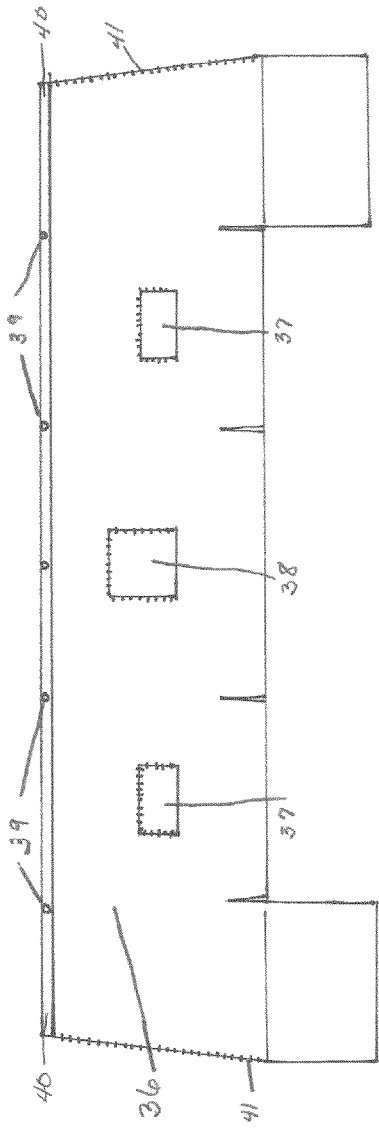
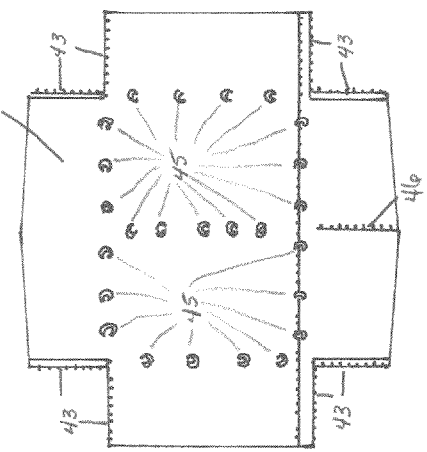

PORTABLE UNIVERSAL PICKUP BED HUNTING BLIND

CROSS-REFERENCE TO RELATED APPLICATION

The Applicant claims the benefit, under 35 U.S.C. §119(e), of U.S. Provisional Patent Application No. 61/545,133 filed Oct. 8, 2011 and entitled "Portable Universal Pickup Bed Hunting Blind." The entire content of this provisional patent application is incorporated herein by this reference.

BACKGROUND OF THE INVENTION

1. Field of Invention

The present invention relates to portable enclosures adapted to be installed in the bed of a pickup truck to be used as hunting blinds, wildlife viewing blinds, or other types of temporary shelters.

2. Description of Prior Art

There are various types of hunting blinds, and various types of pickup bed enclosures that have been utilized throughout the prior art. None of the prior art pickup bed enclosures provide a portable, universal pickup bed-fitted hunting blind. Until now, hunters and wildlife observers had few choices; either build a semi-permanent or even permanent structure onto a vehicle then camouflage the vehicle and structure with paint, which greatly limited camouflage pattern choices and the vehicle's usability when not hunting, try to hide the vehicle and walk to a permanent remote blind, or carry a portable blind and set it up, far from the hidden vehicle. The last two scenarios almost always require long walks in the dark carrying lots of gear. Either scenario could prove disastrous if an accident were to happen.

SUMMARY OF THE INVENTION

The present invention includes a portable, universally fitted pickup bed enclosure which is particularly suited for use as a hunting blind or wildlife observation blind. All of the components of the enclosure may fit into a carrying case which acts as a bench seat or table surface for the occupant(s) when the enclosure is in use. An enclosure according to the present invention may be fitted behind a truck bed toolbox if such a toolbox is present. An enclosure according to the present invention may be adapted to be installed in a pickup bed having a usable bed wall length of approximately 48 inches or more on each side and an inside bed width of approximately 54-80 inches for full or mid-sized trucks. A narrower cased unit utilizing virtually all of the same technology and components can be constructed for compact pickups. While the following illustrations depict a full-sized pickup bed enclosure, it will be appreciated that the same structure may be adapted for substantially any size of pickup bed which provides enough floor space for an occupant to comfortably sit in the installed enclosure.

The design features incorporated into a pickup bed enclosure structure according to embodiments of the present invention allow the enclosure structure to be mounted onto the truck bed sidewalls of most full-sized and mid-sized pickups produced in the last four decades. Various embodiments provide a weather-resistant private enclosure with adjustable shooting bar and ceiling height to accommodate most users. Various embodiments of the present pickup bed enclosure may also provide a bench seat, as well as sliding windows with concealment curtains, side air vents, truck rear window access, rapid erection and dismantlement capabilities, a theft deterrent system, and allowances for easy entry and exit.

Although designed primarily as a two-person enclosure for pickups, design features of the present invention also allow for quick expansion into a ceiling height adjustable full bed length enclosure with a partial or fully removable top cover for hunting or observing migratory game birds as well as convertibility into a bed length tent structure for camping by adding an enclosure extension kit. Embodiments of the present enclosure structure may also be mounted on top of a wooden or metal frame rather than in a pickup truck bed. Thus the enclosure structure may be quickly erected and used anywhere a covered, reasonably private, open bottomed, 5-sided, weather-resistant outdoor enclosure is needed, i.e., heavy brush blind, outdoor office, kitchen, bathroom, child's playhouse, animal or plant shelter, vending booth, etc.

BRIEF DESCRIPTION OF THE DRAWINGS

FIG. 4 is an isometric view of an extension structure adapted to cooperate with the cradle assembly at one side of the carrying case.

FIG. 5 is an exploded isometric view showing the extension structure components.

FIG. 6 is an isometric view showing the extension structure mounted at one end of the carrying case.

FIG. 7 is an isometric view of the left and right side rails according to various embodiments of the present invention.

FIG. 8 is an enlarged isometric view of one end of one of the side rails shown in FIG. 7.

FIG. 9 is a partially exploded isometric view of an upper end of an enclosure support member along with a height adjustment mechanism.

FIG. 10 is an isometric view of an entire enclosure support member.

FIG. 11 is an exploded isometric view of the lower end of the enclosure support member shown in FIG. 10.

FIG. 12 is an isometric view of one side rail with two enclosure support members in an installed, folded position securing the carrying case/bench seat from removal.

FIG. 13A is a side view of a one-piece shooting bar which may be used on a left or right side of an enclosure according to the invention.

FIG. 13B is a side view of a two-piece shooting bar which may be used on a front or back side of an enclosure according to the present invention.

FIG. 14 is an exploded, enlarged isometric view showing one end of a shooting bar.

FIG. 15 is an isometric view of one end of a shooting bar attached to an enclosure support member.

FIG. 20 is a view of an inside surface of the bottom camouflage surround cover for an enclosure according to one form of the present invention.

FIG. 21 is a view of an inside surface of the camouflage roof cover for an enclosure according to one form of the present invention.

DESCRIPTION OF PREFERRED EMBODIMENTS

By way of introduction, it should be pointed out that the drawings for this disclosure are made from a full-sized working model already constructed for the purpose of testing adjustability for varying truck bed widths, weight, weight loads, storage capacity requirements, weather resistance, sustainable wind speed tolerances when erected, adjustability and requirements of shooting bars and ceiling height, time required for assembly, potential alternative uses, and mounting methods.

In the following disclosure reference is made to positional terms such as top, bottom, side, left, and right. These positional terms are used for convenience in describing components and aspects of the invention and refer generally to the orientation of the enclosure and pickup shown in FIG. 24. The designation "left" is used below to refer generally to the left or driver side of the vehicle, while the designation "right" is used generally to refer to the right or passenger side of the vehicle. These positional designations are not intended to be limiting.

Figure 1:
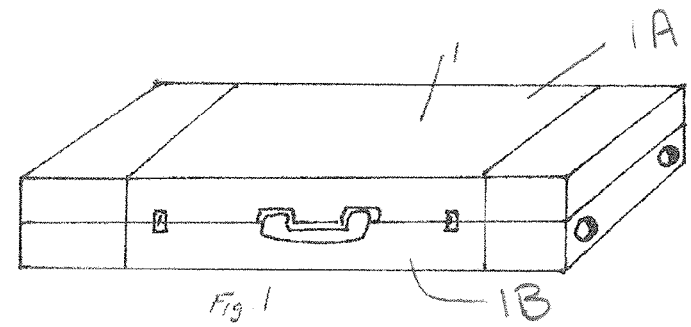
FIG. 1 is an isometric view of a carrying case according to embodiments of the present invention, which is approximately the size of a double, scoped-rifle carrying case.

As shown in FIG. 1, one preferred form of an enclosure according to the invention includes a carrying case 1. Carrying case 1 in this embodiment is a lockable storage box for all of the enclosure components and a surrounding support cover for the bench seat's width adjustable support cradle which forms part of an extension structure as will be described below. Carrying case 1 includes a first case side 1A which connects together with a second case side 1B in the closed position shown in FIG. 1 to form a carrying case volume. Although first case side 1A and second case side 1B may be hinged together along one edge of the unit and may include one or more locking mechanisms along the opposite edge, the invention is not limited to any particular means for connecting the two case sides together in the closed position. Carrying case 1 may be constructed out of many different types of materials or combinations of materials, i.e., reinforced polymers, fiberglass, or aluminum, to name a few. A preferred form of the invention uses aluminum sheeting with welded corners, aluminum hinges and rivets, and stainless steel clasps. All materials chosen for this prototype are of durable, corrosion resistant materials, for long service life. The carrying case when converted to a bench seat as will be described below in connection with FIG. 6 and correctly installed on the truck bed will easily handle the shifting weight of two 300 pound hunters. Carrying case 1 in the illustrated example embodiment is roughly the same size of a double scoped-rifle gun case and thus may be carried as such.

Figure 2:
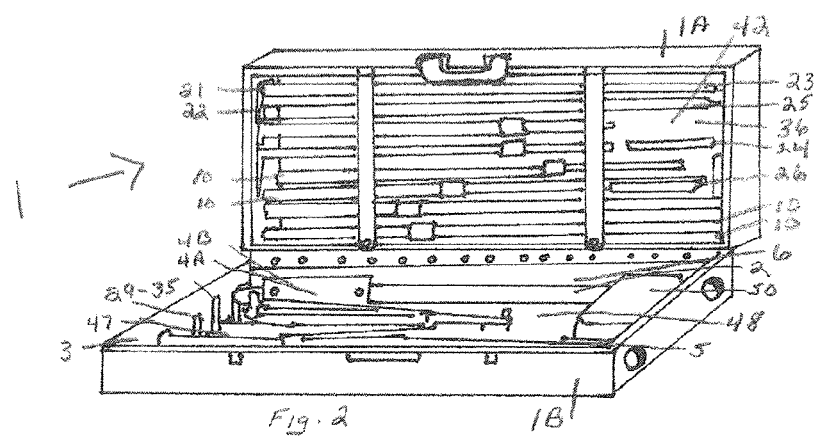
FIG. 2 is an isometric view of the carrying case in FIG. 1 in an open position, showing how all of the enclosure components fit therein, with the camouflage surround and magnetic panels stored behind the visible structure components.
Figure 16:
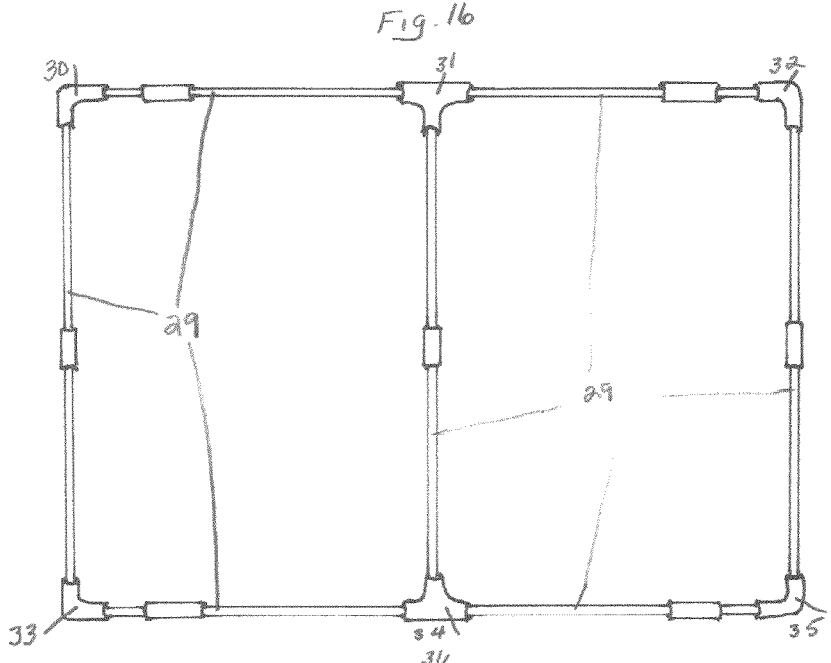
FIG. 16 is a top view of the assembled roof structure of an enclosure according to one form of the invention.

FIG. 2 represents only one of numerous possible storage arrangements for all of the enclosure's components. Case side 1A (FIG. 2) illustrates one such preferred arrangement, where its volume is sufficient to simultaneously contain the roof cover 42 (FIG. 21), the lower surround cover 36 (FIG. 20), the shooting bars 21, 22, 23, 24, 25, and 26 (FIG. 13A and FIG. 13B) and the enclosure's "vertical bars" (FIG. 10). All of these components will be discussed below. The case side 1B shown in FIG. 2 has a volume sufficient to simultaneously contain a number of camouflage magnetically attached body cover panels 48 (FIG. 23), the left side rail 5 (FIG. 7), the right side rail 6 (FIG. 7), the roof structure members 29, 30, 31, 32, 33, 34, and 35 (FIG. 16), the four corner posts 47 (FIG. 22), the slide shelf components 4A and 4B (FIG. 5), the cradle assembly 2 and 3 (FIG. 3), and a small parts container 50 (FIG. 2). Not illustrated are other stored components including but not limited to: numerous plastic windows, numerous camouflage net curtains, and numerous elastic cords. All of the components referred to as being stored in case side 1B (except the small parts storage container) will be discussed below.

Figure 3:
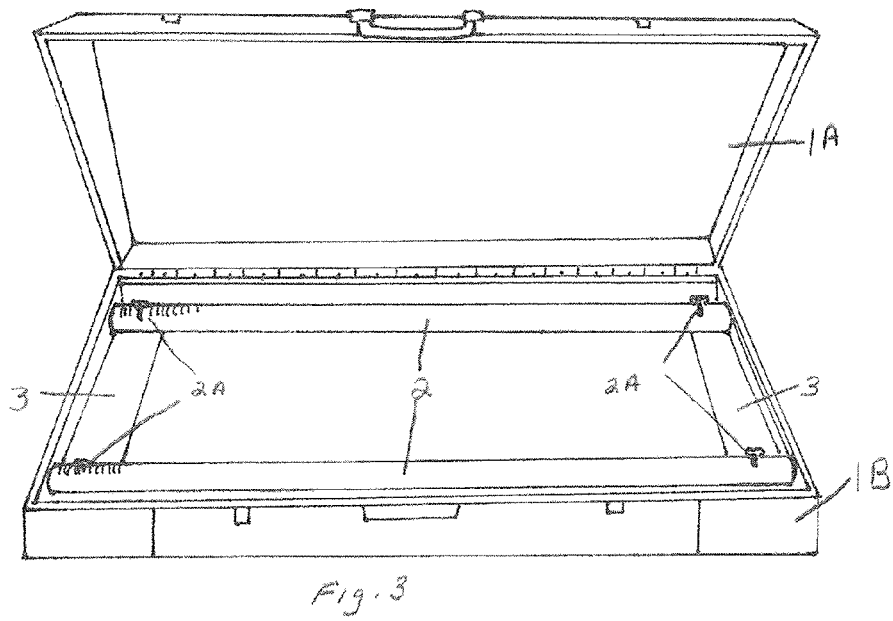
FIG. 3 is view in perspective showing the carrying case in an open position to show an example cradle assembly for adapting the carrying case for use as a bench seat for the enclosure occupant.

FIG. 3 shows a bench seat support cradle which forms part of an extension structure which allows carrying case 1 to be used as a bench seat or table surface in an installed enclosure according to various forms of the invention. The illustrated bench seat support cradle includes two carrying case length aluminum tubes 2 with aluminum angle material 3 welded to the tubes at each end forming a cradle, which is secured to one of the carrying case sides by multiple short machine screws or some other suitable connection arrangement (not shown in the drawings). As shown in FIG. 2, carrying case 1 includes openings at each end which are aligned with the openings of tubes 2 (FIG. 3). These openings allow the attachment of adjustable slide shelves as will be described in connection with FIGS. 4-6 to complete the extension structure which allows carrying case 1 to be used as a seat or table surface in the installed enclosure.

FIG. 4 shows one assembled adjustable slide shelf 4, while FIG. 5 shows an exploded view of the slide shelf. Each adjustable slide shelf 4 in the illustrated preferred form of the invention includes a piece of aluminum angle material 4A with square holes made into one section to accommodate a pair of attaching bolts 4C, and a pair of aluminum bars 4B, each bar 4B having one end threaded to screw onto a respective one of the attaching bolts. Other suitable attaching materials and methods could also be utilized. When assembled as shown in FIG. 4 the bars 4B slide in to the tubes 2 (FIG. 3) of the bench seats support cradle forming a truck bed width adjustable sliding bench seat that rides on top of the bed protector side rails as will be described below. Each slide shelf 4 may be locked in position relative to the tubes 2 shown in FIG. 3 using a respective set screw 2A or other securing device. The adjustment facilitated by the sliding arrangement between bars 4B (FIGS. 4 and 5) and tubes 2 (FIG. 3) allows the slide shelves 4 to be positioned so that the resulting bench seat shown in FIG. 6 fits snugly between the side rails described below. The angle material structure of the slide shelves 4 also allows the bench seat to be slid forward or rearward in the installed enclosure to meet the occupant's needs.

FIG. 7 is an illustrated example of one preferred, possible design of the right and left bed protector side rails 5 and 6 (FIG. 7) which may simply be referred to as "side rails." The right and left side rails are interchangeable and adapted to be secured on top of the right and left bed walls of the pickup truck in an installed position. The side rails consist of aluminum angle material (other materials could alternately be used), fitted with raised channel receiver slots suitably attached at the front and rear of each side rail (FIG. 8). There can be numerous suitable attaching methods for securing the side rails to the pickup beds' right and left side walls. These methods may include but are not limited to a clamp at each end to clamp the side rail into place, magnets to magnetically attach the side rails in place, and expanding insertion blocks which would use the pre-existing holes located along the tops of most pickup bed side walls. Another preferred method of mounting the side rails more rigidly to the truck bed sidewalls and thus aiding in theft prevention is by the use of self-tapping screws utilizing the counter sunk screw holes 7 shown in the example of FIG. 7 and FIG. 8.

Figure 22:
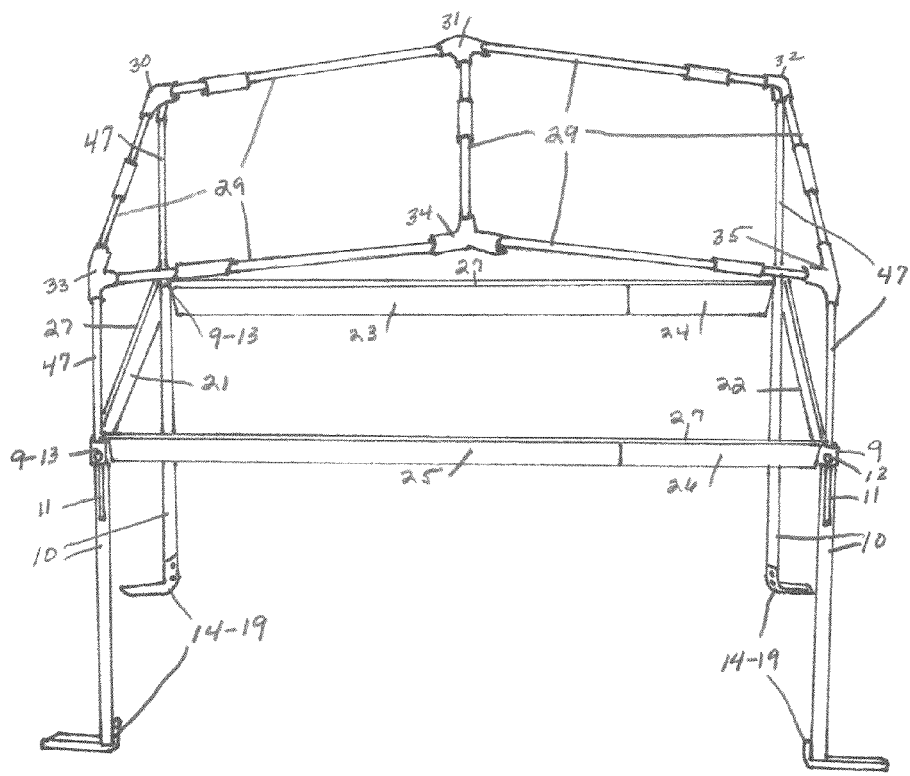
FIG. 22 is an isometric view of the assembled frame of an enclosure according to one form of the present invention.
Figure 24:
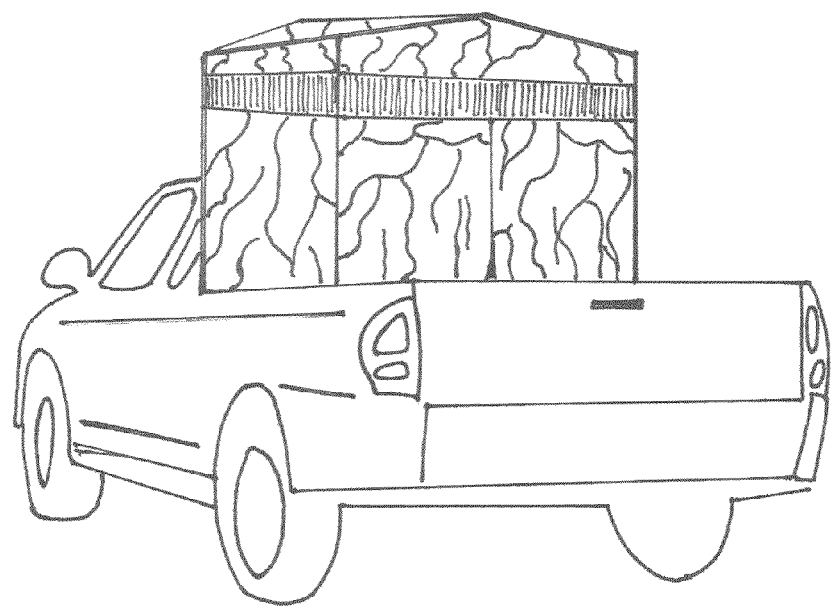
FIG. 24 is a view in perspective from the rear of a pickup having an enclosure according to the present invention in an operating position prior to having the matching magnetic camouflage panels attached to the truck body.

FIG. 8 illustrates an example of a side rail enclosure support member receiver 8LF, which, in this embodiment, is open at either end and adapted to receive and secure a pivoting foot member 14 of the vertical bar (FIG. 11). The enclosure support member receivers 8LF and 8LR (FIG. 7) suitably secured atop the left side rail 5 (FIG. 7) are designed to receive the left front and left rear vertical bar assembly (FIG. 10). Enclosure support member receivers 8RF and 8RR (FIG. 7) respectively also receive the pivoting foot member 14 of the right front and right rear vertical bars (FIG. 10) which will be described below in connection with FIG. 10 and FIG. 11. By having the enclosure support member receivers 8LF, 8LR, 8RF, and 8RR, open at either end paralleling the pickup truck's bed width dimension, the pivoting foot member 14 of the enclosure vertical bar (FIG. 10) may be slid into the receiver channel 8LF (FIG. 8) opening from either side of the bed wall. The foot member 14 may be inserted and slid into the current dimensional position from the outside of the bed wall for mid-sized pickups or from the inside of the bed side walls for full-sized truck beds as shown in the example of FIG. 22. Threaded holes 8A (FIG. 8) of each enclosure support members receiver 8LF, 8LR, 8RF, or 8RR (FIG. 7) accommodate a positionable set screw which can lock in place the sliding foot attachment 14 of each of the enclosure's vertical bars (FIG. 10), thus allowing the pickup truck enclosure's dimensions to remain constant no matter the pickup's bed width (FIG. 22 and FIG. 24).

The illustrated embodiment includes two left side and two right side enclosure support members (FIG. 10) each having a height adjustable lock mechanism 9 and pivoting foot member 14. The enclosure support members may also be referred to herein as "vertical bars." The illustrated right front, right rear, left front, and left rear vertical bars (FIG. 10) are hollow aluminum square tubes of equal heights (other materials and dimensional sizes could be substituted), each having a pivoting foot member 14 which is adapted to be received in a respective support receiver 8LF, 8LR, 8RF, or 8RR secured atop the side rails (FIG. 7), secured at its base with a usable in or out sliding length of preferably at least 7" (FIG. 11). The sliding, pivoting foot member attachment 14 (which may simply be referred to as the "pivoting foot") is attached to the vertical bar main tube 10 by a tamper-proof stainless steel screw 18 passing through a high-walled washer 19 aiding in theft prevention. Between the right angle attachment point of the pivoting foot 14 and the vertical bars main tube 10 is a nylon washer 17 which allows pre-load tension to be set for the vertical bar pivoting action. The bottom of the vertical bar tube 10 has two holes corresponding to the two holes in the mounting section of the pivoting foot 14. The lower hole has an installed threaded rivet 16 which receives the glued threads of the attaching tamper-proof bolt 18. The upper holes are for receiving a ringed pull pin 15 (FIG. 11) which, when in place, holds the respective enclosure support in the desired upright position shown in FIG. 22 and aids in stabilizing the entire enclosure structure in high winds.

The purpose of the pivoting foot 14 is two-fold. First, the pivoting foot 14 at the bottom of each vertical bar tube 10 allows the enclosure structure dimensions to remain constant because of the perpendicular adjustability to the truck bed walls which will accommodate various truck bed widths. Second, the pivoting foot 14 allows the respective vertical bar 10 to be folded down over the tops of the installed adjustable slide shelves 4 of the bench seat (FIG. 6) and locked together (FIG. 12). A larger diameter, pointed version of the tamper-proof stainless steel bolt 18 and high-walled washer 19 are used to secure the vertical bar pivoting foot attachments 14 in the respective side rail receivers (FIG. 8) via the threaded holes 8A and corresponding countersinks in the tops of the pivoting foot 14 (FIG. 11). This folded down and locked position deters theft of the bench seat/carrying case and contents while it is stored in the back of the pickup truck.

The height adjustable sliding lock assembly 9 built onto each of the enclosure support members (vertical bars) 10 consists of the four components shown in FIG. 9. In particular, the height adjustable sliding lock assembly 9 includes a tube for the main body 9A, a thumb screw or other securing device 13 which holds and locks the main body at the desired height, and a stainless steel glued set screw 12 which travels up and down in a telescoping fashion inside the slot 11 cut into one side of the respective vertical bar 10. The glued set screw 12 of each slide lock assembly serves two purposes. First, it limits telescoping travel of the lock assembly 9. Second, the glued set screw 12 of each slide lock assembly serves as the bottom stop for one of the four roof structure (FIG. 22) corner posts 47 which is inserted into the top of the enclosure support member (vertical bar) hollow tube 10 and telescopes up or down with the height adjustable sliding lock assembly 9. The design of the height adjustable sliding locks (FIG. 9) serves multiple purposes. First, the sliding locks serve as a rest for the shooting bars (FIG. 15) which can be very quickly installed or removed. Second, the sliding locks allow the shooting bar (FIG. 13A and FIG. 13B) height to be adjusted and locked in place easily (even with thick gloves) via the preferred thumbscrew 13 (FIG. 9) (or other securing device) attached to each lock assembly. Third, the sliding locks allow for slight leveling adjustments for unlevel parking conditions. Fourth, since the respective sliding lock assembly's glued stainless steel set screw 12 acts as bottom stop for the telescoping travel of one of the enclosure structure corner posts 47 of the roof structure (FIG. 17), as the height of the shooting bars (FIG. 15) are raised or lowered, so is the enclosure's ceiling height, thus maintaining a constant 360 degree window viewing height, as illustrated in examples FIG. 24 and FIG. 25. The window viewing height may, for example, be approximately 10 inches, but could be reasonably increased or decreased simply by changing the length of the corner posts 47, which are inserted into the tops of the hollow tubes 10 of the enclosure support members (vertical bars) 10 shown in FIG. 10, and rest on top of the telescoping lock mechanisms 9 and stop screw 12.

A number of horizontal shooting bars are shown for purposes of example in FIG. 13A and FIG. 13B. Each shooting bar is adapted to extend in a connected position between two adjacent enclosure support members 10 placed in the upright position shown in FIG. 22. Hollow aluminum square tubes are illustrated as one preferred form of the shooting bars in FIG. 13A and FIG. 13B. Each of the right shooting bar 21 and left shooting bar 22 is designed as a one piece unit. The front shooting bar is made up of a main part 23 and an extension 24, and the rear shooting bar similarly includes a main part 25 and an extension 26. The two piece design of the front and rear shooting bars allows the bars to be separated for storage in case 1 (shown in FIGS. 1 and 2). The two sections of the rear shooting bar 25 and 26 are coupled together by an inserted rod 25A which may be rigidly fixed inside the opening of either the longer end of the shooting bar 25 or the opening of the shorter end of the shooting bar 26. The same procedure applies to the front shooting bar made up of parts 23 and 24.

One preferred form of the invention attaches the shooting bars (FIG. 13A and FIG. 13B) to the telescoping height adjustment device (FIG. 15) at two adjacent enclosure support members (vertical bars) as shown in FIG. 22. As best shown in FIG. 15, the connection between the respective shooting bar may be made via a flat 90 degree steel corner bracket 28. The corner brackets 28 may be secured in place to the respective shooting bar by glued machine screws 28A or some other suitable attaching method. This corner bracket connection allows for very quick and easy placement or removal of the shooting bars. As shown in FIG. 15, a raised U-channel 27 is secured atop the full length of each shooting bar. Each channel 27 forms a bottom holder and slide surface for plastic windows of the enclosure (the windows not being shown in the drawings). When installed, the windows may be held in the upright position by inverted U channels (not illustrated) resting across their tops each having eyelets on opposite ends which may slide vertically onto and connect to two adjacent corner posts 47 above and parallel to each installed shooting bar (FIG. 22). Other methods for holding or securing the windows could also be employed. Each shooting bar may also have a full length strip of Velcro® material (or other hook and loop connecting material) suitably bonded to its outside face to aid in attaching the enclosure's bottom surround cover 36 (FIG. 20). Both the enclosure's roof cover 42 and bottom surround cover 36 will be described below in connection with FIG. 21 and FIG. 20, respectively.

Figure 17:
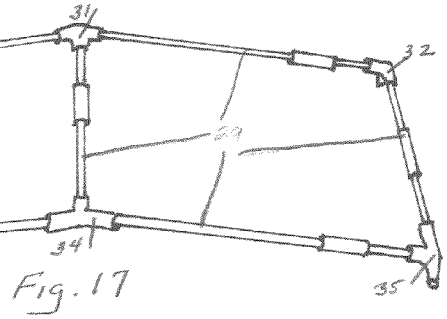
FIG. 17 is an isometric view of a top portion of the assembled roof structure.
Figure 18:
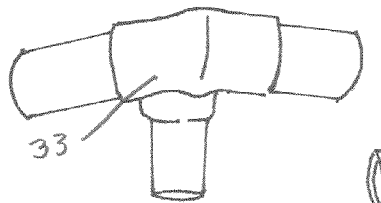
FIG. 18 is an isometric view of a left rear corner three-way roof connector of the roof structure shown in FIG. 17.
Figure 19:
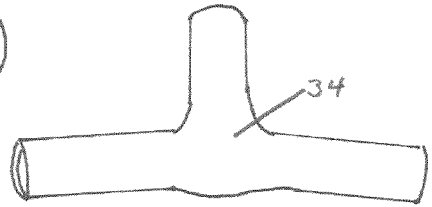
FIG. 19 is a top view of the rear center three-way roof connector of the roof structure shown in FIG. 17.

The enclosure roof structure support frame (FIG. 16) consists of a number of roof members adapted to be connected together to form a roof frame structure, which could be reasonably designed in many shapes or forms; domed, slanted, arched, etc. using many materials and joining methods. FIG. 17 shows one preferred form that when assembled represents an A-frame style roof structure with at least a 10 degree pitch down the right and left sides for rainwater drainage. The roof support frame (FIG. 17) is constructed of interlocking roof members 29 and six specially designed aluminum connectors 30, 31, 32, 33, 34, and 35. The connectors include four position-specific corner connectors, left front 30, right front 32, left rear 33, and right rear 35. Each of these three-way corner connectors has a true 90 degree angle and a third leg with at least a 10 degree angle (FIG. 18), all designed to receive a corresponding roof support member 29. The two center roof support aluminum three-way connectors 31 and 34 have at least a 10 degree "V" formed at the front 31 or rear of the connector 34 and a joining horizontal leg (FIG. 19). The bottom of each corner three-way connector 30, 32, 33, and 35 is adapted to receive the top of each of the four respective corner posts 47 installed into the tops of the four respective vertical bars (FIG. 10) as exampled in FIG. 22. All of the roof structure support members (FIG. 16) may be shock corded together for quick assembly and compact case storage.

The enclosure roof cover material (FIG. 21) and the bottom surround cover material (FIG. 20) are both made of lightweight, waterproof camouflage printed materials with potentially dozens of patterns available and may have a fire retardant coating. The top edge of the enclosure's surround cover 36 will attach to the four installed shooting bars (FIG. 13A and FIG. 13B) with full length strips of Velcro® material via the surround cover's full length strip of Velcro® material 40. Snaps 39 may also be incorporated into the design. Closeable screened vents 37 are located on the right and left sides. A forward facing zippered window 38 will allow access into the truck's cab area via the sliding rear window if the truck is so equipped. A vertical zipper 41 centered in the rear of the enclosure surround cover 36 provides easy entry and exit from the assembled enclosure (FIG. 24) or may be used in conjunction with the enclosure extension kit.

One preferred form of the enclosure roof cover (FIG. 21) is designed to fit snugly over the enclosure's roof support members (FIG. 17) and may be secured in place via multiple suitably attached sections of Velcro® material 45. Securing the enclosure roof cover 42 to the roof structure (FIG. 16) is only necessary in high winds, or when driving to another location with the enclosure fully assembled. There is a full length zipper strip 44 following the roof line at the rear of the enclosure's roof cover for adding the additional camouflage material of the enclosure extension kit and a vertical zipper 46 centered in the rear of the enclosure's roof cover for entering and exiting convenience. Additionally, there are four zippers 43 located at each adjacent corner of the enclosure's roof cover (FIG. 21) which allow the occupant the option of "opening" one or more sides of the enclosure roof cover, thus creating a greater horizontal viewing "window" for overhead viewing of migratory game birds or wildlife observation.

Figure 25:
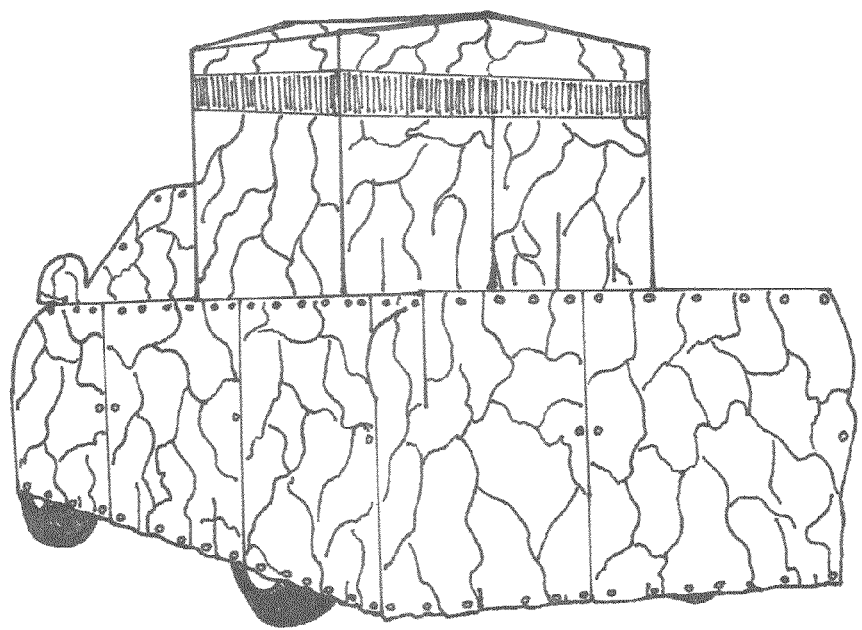
FIG. 25 is a view in perspective from the rear of a pickup having an enclosure according to the present invention in an operating position and with matching magnetic camouflage panels attached to the truck body.

A slightly taut elastic cord is suitably attached in place along all of the bottom edges of the enclosure roof cover 42 (FIG. 21) which keeps the installed roof cover taut against the four corner posts 47 joining the enclosure's vertical bars 10 (FIG. 10) and the enclosure roof structure (FIG. 22). When the four corner zippers 43 of the enclosure roof cover 42 are in their closed position (FIG. 24), a constant height, 360 degree viewing window is achieved (FIG. 25). There may be four shooting bar length (FIG. 13A and FIG. 13B), two-piece camouflage net curtains (not illustrated) to aid in the concealment of the enclosure occupants. These sliding curtains can be used without or in conjunction with the sliding plastic windows in place, or when a portion of the enclosure roof cover is folded back for migratory bird observation, since the curtain slides along an elastic cord attached between two adjacent corner posts 47 joining the enclosure support members or vertical bars (shown at reference numeral 10 in FIG. 10). FIG. 24 is an illustrative example of the enclosure's defined volume once the enclosure is fully assembled (FIG. 22) with the roof cover (FIG. 21) and the surround cover (FIG. 20) attached to their respective enclosure support members.

Figure 23:
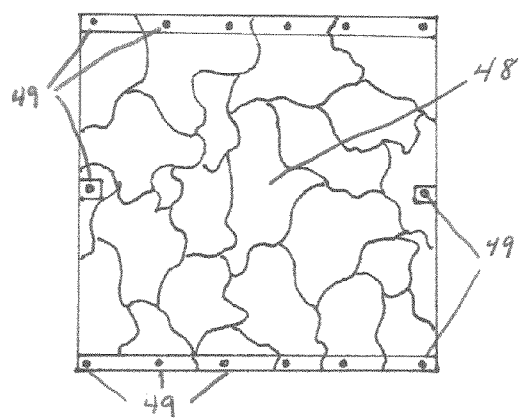
FIG. 23 is a side view of a magnetically attached camouflage panel which may be used together with an enclosure embodying the principles of the present invention.

Concealing and camouflaging the pickup truck body (FIG. 24) is accomplished by adding lightweight, matching camouflage body cover panels 48. These panels of camouflage material (FIG. 23) may be held in place by strong magnets that are suitably attached in strategic positions 49 to a sheet or section of camouflage panel material. A number of these magnetically attaching camouflage body cover panels 48 may be included as part of the portable universal pickup bed enclosure components (FIG. 2). The dimensional size, number of magnets, and their position may be varied according to the weight and type of the camouflage material desired. The magnetic camouflage body cover panel exampled in FIG. 23 is one preferred form and is approximately 60" tall and wide for easy and compact storage. Each of these included magnetic camouflage body cover panels has a row of six equally spaced magnets suitably attached across the top and bottom edges of the panel 48 and at least one attached magnet on either side edge of the panel (FIG. 23). This arrangement may provide cut-to-fit options of the matching camouflage magnetically attached body cover panels (FIG. 25). Although the camouflage panels are preferably held in place with magnets, other embodiments may include at least some camouflage panels equipped with suction cups to hold the respective panel of material in place to cover a portion of the truck.

The abundant number of uses and manner of operation should be apparent by the above description of the present invention. Therefore, with respect to the above description, it can be realized that dimensional variations of the components of the invention including materials, size, camouflage patterns, shapes, form, function, assembly techniques, manner of operation, and uses are within the expertise of those skilled in the art, and since numerous changes and modifications will likely occur by those skilled in the art, it is not intended nor desired to limit the invention to the exact components, construction, and operation described and illustrated. Thus, all suitable structural variations of the components and relationships to those described in the specification and illustrated in the drawings are intended to be encompassed by the principles of the present invention and should be considered as falling within the purview of the invention. In particular, while various elements are described as having a particular shape, or connected, or are formed in a particular fashion, the present invention is not intended to be limited to that particular shape or connection arrangement. For example, while enclosure supports 10 are shown as square tubes it will be appreciated that they may be round tubes or have any other suitable profile. As another example, while certain components are described above as being welded or connected via a particular type of fastener, the components may be connected in any suitable fashion. Furthermore, while certain dimensions have been described above in connection with the illustrated embodiment, the invention is not limited to any particular dimension for the various components, and it will be appreciated by those of skill in the art that a wide range of dimensions may be suitable for a given embodiment of the present invention.

The invention claimed is:

1. An enclosure for use with a pickup truck having a truck bed defined between a left bed wall and a right bed wall, the enclosure including:
   (a) a carrying case including a first case side adapted to be connected together with a second case side in a closed position to form a carrying case volume;
   (b) a left side rail adapted to be secured to the left bed wall of the pickup truck in an installed position, and a right side rail adapted to be secured to the right bed wall of the pickup truck in an installed position;
   (c) two left side enclosure support members, each having a respective lower end adapted to be connected to the left side rail at a spaced apart position with respect to the other left side enclosure support member;
   (d) two right side enclosure support members, each having a respective lower end adapted to be connected to the right side rail at a spaced apart position with respect to the other right side enclosure support member, each left side and right side enclosure support member including a respective height adjustment device associated therewith and residing at a respective corner of an enclosure area when connected to the respective side rail in the respective installed position for that side rail and placed in an upright position with respect to that side rail;
   (e) a number of roof members adapted to connect together to form a roof frame structure, the roof frame structure including a respective roof support member for each enclosure support member, the respective roof support member being adapted to be positioned in a telescoping relationship with the respective enclosure support member and secured in a respective telescoping position with the height adjustment device associated with that respective enclosure support member;
   (f) a number of shooting bars, each shooting bar adapted to extend in a connected position between two adjacent enclosure support members placed in the upright position, each shooting bar in the connected position adapted to move with the roof support member as that roof support member moves in a telescoping relationship with the respective enclosure support member;
   (g) an enclosure surround adapted to be connected in a surround position covering the roof frame structure and the enclosure support members in the upright position, the enclosure surround in the surround position defining a volume for the enclosure; and
   (h) an extension structure connected at least at one end of the first case side, the extension structure and first case side having a length sufficient to extend between the left side rail in the installed position and the right side rail in the installed position so as to form a bench resting at one end on the left side rail and resting at the opposite end on the right side rail.

2. The enclosure of claim 1 wherein the carrying case is sized such that the carrying case volume is sufficient to simultaneously contain the extension structure, enclosure surround, each roof member, each shooting bar, and each enclosure support member.

3. The enclosure of claim 1 wherein the carrying case is sized such that the carrying case volume is sufficient to simultaneously contain the left side rail and the right side rail together with the extension structure, enclosure surround, each roof member, each shooting bar, and each enclosure support member.

4. The enclosure of claim 1 wherein the extension structure includes a left side extension and a right side extension, the left side extension having two extension tubes each adapted to be slidingly received in a respective extension tube receiver located at a first end of the carrying case first case side, and the right side extension having two extension tubes each adapted to be slidingly received in a respective extension tube receiver located at the end of the first case side opposite to the first end.

5. The enclosure of claim 1 wherein the left side rail and the right side rail each include two spaced apart enclosure support receivers, each spaced apart enclosure support receiver adapted to receive a lower end of a respective enclosure support member.

6. The enclosure of claim 5 wherein each enclosure support member includes a foot member which is adapted to be received in a respective enclosure support receiver, each foot member being pivotally connected to the remainder of the respective enclosure support member and being lockable to retain the respective enclosure support member in the upright position.

7. An enclosure for use with a pickup truck having a truck bed defined between a left bed wall and a right bed wall, the enclosure including:
   (a) a carrying case including a first case side adapted to be connected together with a second case side in a closed position to form a carrying case volume;
   (b) a left side rail adapted to be secured to the left bed wall of the pickup truck in an installed position, and a right side rail adapted to be secured to the right bed wall of the pickup truck in an installed position;
   (c) two left side enclosure support members and two right side enclosure support members, each enclosure support member adapted to reside at a respective corner of an enclosure area when the enclosure is in an operating position on the pickup truck;

(d) a number of roof members adapted to connect together to form a roof frame structure, the roof frame structure being adapted to connect to the enclosure support members when the enclosure is in the operating position on the pickup truck;

(e) at least one shooting bar, each shooting bar adapted to extend in a connected position between two adjacent enclosure support members when the enclosure is in the operating position on the pickup truck;

(f) an enclosure surround adapted to be connected in a surround position covering the roof frame structure and the enclosure support members to define a volume for the enclosure; and (g) an extension structure adapted to connect to at least at one end of the first case side such that the extension structure and first case side has a length sufficient to extend between the left side rail and the right side rail when the enclosure is in the operating position on the pickup truck, wherein the carrying case is sized such that the carrying case volume is sufficient to simultaneously contain the extension structure, enclosure surround, each roof member, each shooting bar, and each enclosure support member.

8. The enclosure of claim 7 wherein the carrying case is sized such that the carrying case volume is sufficient to simultaneously contain the left side rail and the right side rail together with the extension structure, enclosure surround, each roof member, each shooting bar, and each enclosure support member.

9. The enclosure of claim 7 wherein the extension structure includes a left side extension and a right side extension, the left side extension having two extension tubes each adapted to be slidingly received in a respective extension tube receiver located at a first end of the carrying case first case side, and the right side extension having two extension tubes each adapted to be slidingly received in a respective extension tube receiver located at the end of the first case side opposite to the first end.

10. The enclosure of claim 7 wherein the left side rail and the right side rail each include two spaced apart enclosure support receivers, each adapted to receive a lower end of a respective enclosure support member.

11. The enclosure of claim 10 wherein each enclosure support member includes a foot member which is adapted to be received in a respective enclosure support receiver, each foot member being pivotally connected to the remainder of the respective enclosure support member and being lockable to retain the respective enclosure support member in the upright position.

12. The enclosure of claim 7 further including a number of camouflage panels, each camouflage panel including a sheet of panel material and one or more magnets, the sheet of panel material having one side providing a desired camouflage pattern, and the one or more magnets being attached to the sheet of panel material at least along a top edge of the sheet of panel material.

13. The enclosure of claim 7 wherein each camouflage panel includes two side edges extending transverse to the top edge of the sheet of panel material and wherein each side edge of the sheet of panel material includes at least one magnet attached thereto.

14. A camouflage panel for attachment to a vehicle body, the camouflage panel including:

(a) a sheet of panel material having a top edge and two laterally spaced apart side edges, and also having one side providing a desired camouflage pattern; and (b) one or more magnets attached to the sheet of panel material along the top edge thereof.

15. The camouflage panel of claim 14 wherein each side edge of the sheet of panel material includes at least one side panel magnet attached thereto.

\* \* \* \* \*